A. HARTMAN.
DRAFT APPLIANCE FOR AGRICULTURAL IMPLEMENTS.
APPLICATION FILED APR. 2, 1909.
929,424. Patented July 27, 1909.
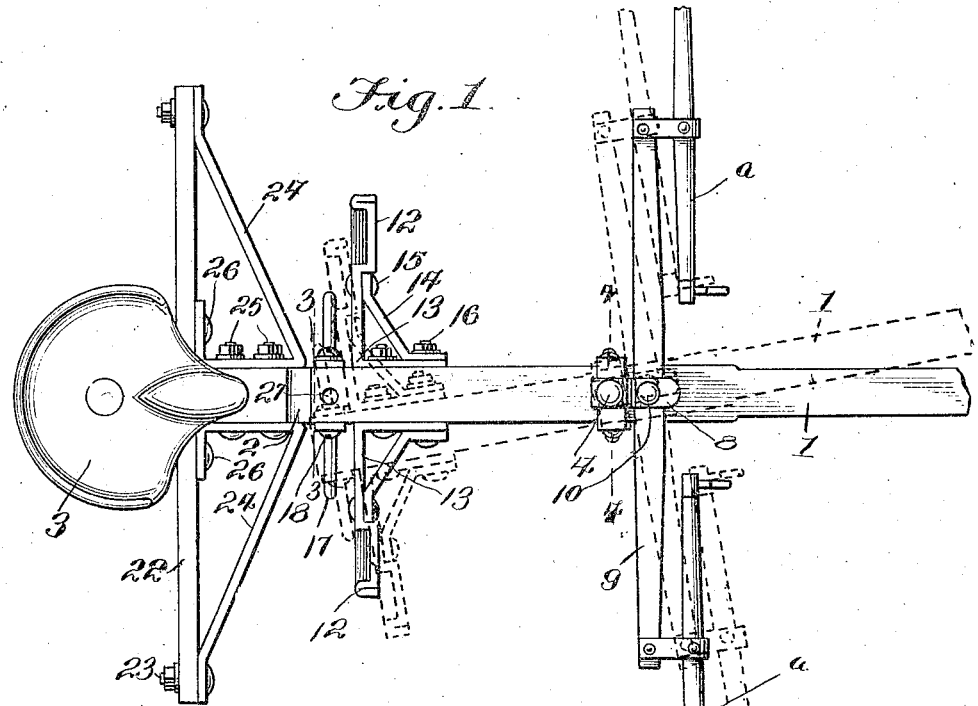
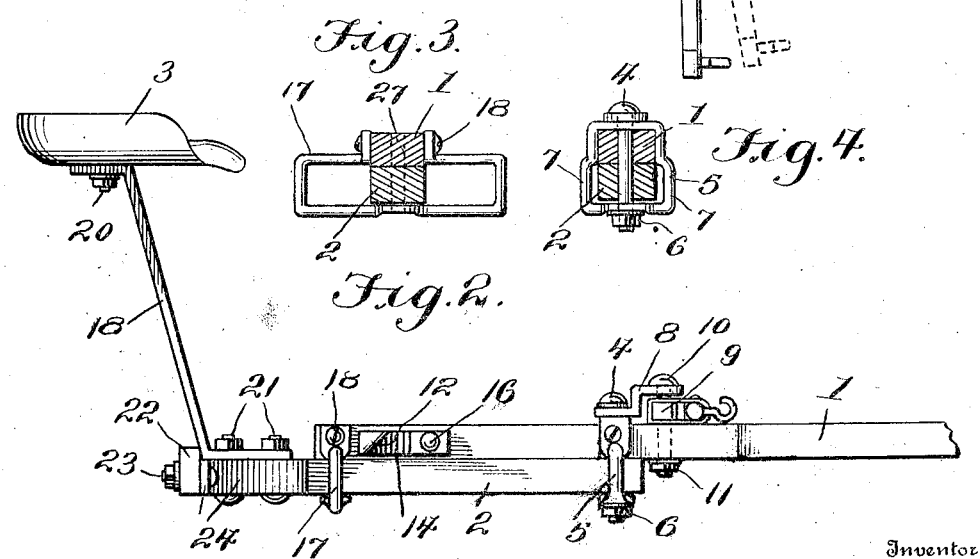
Witnesses
J. T. L. Wright,
Inventor
Albert Hartman,
By Victor J. Evans,
Attorney

UNITED STATES PATENT OFFICE.

ALBERT HARTMAN, OF SAN ANTONIO, TEXAS.

DRAFT APPLIANCE FOR AGRICULTURAL IMPLEMENTS.

No. 929,424.    Specification of Letters Patent.    Patented July 27, 1909.

Application filed April 2, 1909.  Serial No. 487,443.

*To all whom it may concern:*

Be it known that I, ALBERT HARTMAN, a citizen of the United States of America, residing at San Antonio, in the county of Bexar and State of Texas, have invented new and useful Improvements in Draft Appliances for Agricultural Implements, of which the following is a specification.

This invention relates to draft appliances for agricultural implements, and one of the principal objects of the invention is to provide reliable and efficient means for guiding a harrow, cultivator or other agricultural implement by means of a pivoted draft tongue and a foot lever secured to said tongue in position to be utilized by the feet of the driver to swing the tongue and to keep the harrow disks or other implements in proper alinement.

Another object of the invention is to provide a draft appliance embodying a draft tongue which can be swung at opposite sides of the draft line for a limited distance and which can be controlled by the driver of the draft animals.

These and other objects may be attained by means of the construction illustrated in the accompanying drawings, in which,—

Figure 1 is a plan view of a draft appliance made in accordance with my invention, and showing in dotted lines one of the positions to which the tongue may be swung in operation. Fig. 2 is a side elevation of the same. Fig. 3 is a sectional view on the line 3—3 of Fig. 1. Fig. 4 is a sectional view on the line 4—4 of Fig. 1.

Referring to the drawing, the numeral 1 designates a draft tongue or pole, and 2 is a bar for supporting the driver's seat 3. The tongue or pole 1 is pivoted to the bar 2 by means of a pin or bolt 4 which extends through a yoke or keeper 5 and through the tongue 1 and the bar 2, as shown more particularly in Fig. 4, said bolt having a nut 6 applied to the end thereof outside the yoke 5. As shown in Fig. 4, the yoke 5 is provided with side enlargements 7 which will permit a limited lateral movement to the tongue 1 relatively to the bar 2. A hammer strap 8 is connected to the yoke 5 by the bolt 4, and a doubletree 9 is pivoted to the tongue and to the hammer strap 8 by a bolt 10 extending through the hammer strap, the doubletree and the tongue 1, said bolt being provided with a nut 11 underneath the tongue. The doubletree 9 is limited in its pivotal action upon the tongue 1 by means of its proximity to the yoke 5. However, since the tongue 1 is pivoted to the bar 2, the entire tongue may swing upon the bolt 4 to a limited extent. Secured to the rear end of the tongue 1 upon opposite sides thereof is a foot rest 12. These foot rests are each provided with an integral bar 13 bolted to the side of the tongue, and a brace bar 14 is secured by means of bolts 15 to the foot rest and by means of a bolt 16 to the tongue. To limit the pivotal action of the tongue 1 a suitable keeper 17 is secured to opposite sides of the tongue by means of a horizontal bolt 18. The keeper 17 is provided with oppositely disposed loops which will permit the tongue 1 to swing to a limited extent upon either side of the central draft line.

The seat 3 is secured to a standard 19 by means of a bolt 20, said standard being connected to the bar 2 by means of bolts 21. A cross bar 22 is secured to the rear end of the bar 2 by means of a bolt 23. Braces 24 are secured to the outer ends of the bar 22, the inner ends of said braces being secured to the bar 2 by bolts 25 and to the bar 22 by means of bolts 26. Connected to the doubletree 9 are swingletrees *a*.

The operation of my invention may be briefly described as follows: The driver sitting upon the seat 3 may place his feet in the rests 12, and by pushing upon one or the other of said rests the tongue 1 may be guided to hold the harrow disks or other implements in proper line. Whenever it is necessary to convey the implement from place to place a pin may be inserted through the hole 27 in the tongue 1, said hole being in alinement with a similar hole in the bar 2 and in the keeper 17, as shown more particularly in Fig. 3. This will hold the tongue rigidly in place.

From the foregoing it will be obvious that my invention, while simple in construction, is very efficient for its purpose and can be readily applied to any agricultural implement.

I claim:—

1. A draft appliance comprising a tongue, a bar to which the tongue is pivoted, a keeper on said tongue to limit the lateral movement thereof relatively to said bar, a foot rest secured to each side of said tongue, and a seat supported upon said bar.

2. A draft appliance comprising a tongue, a doubletree pivoted to said tongue, a bar to which said tongue is pivoted, a keeper secured to opposite sides of said tongue, said keeper inclosing said bar to limit the lateral movement of said tongue relatively to said bar, a foot rest secured to opposite sides of said tongue, and a seat supported upon said bar.

In testimony whereof I affix my signature in presence of two witnesses.

ALBERT HARTMAN.

Witnesses:
M. E. PORTIS,
D. A. McASKILL.